United States Patent Office.

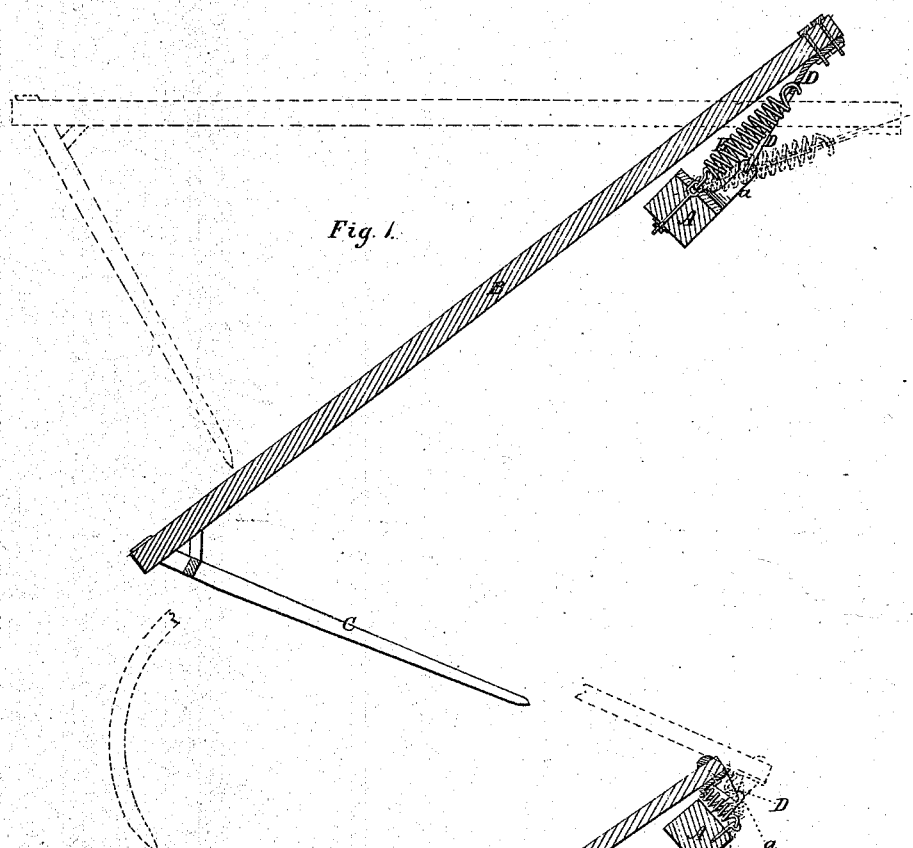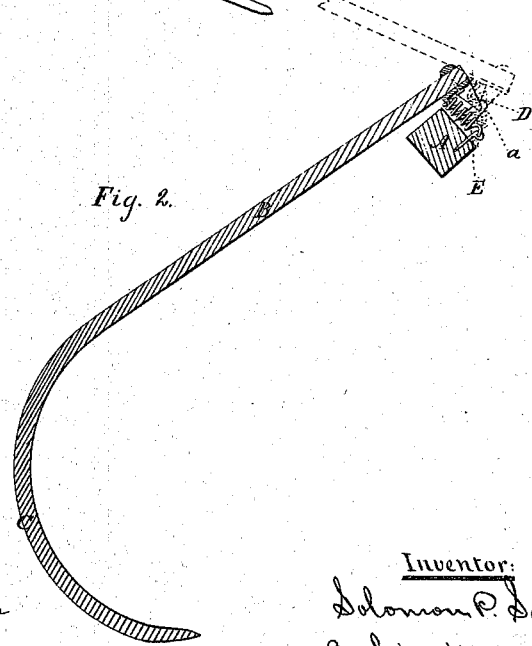

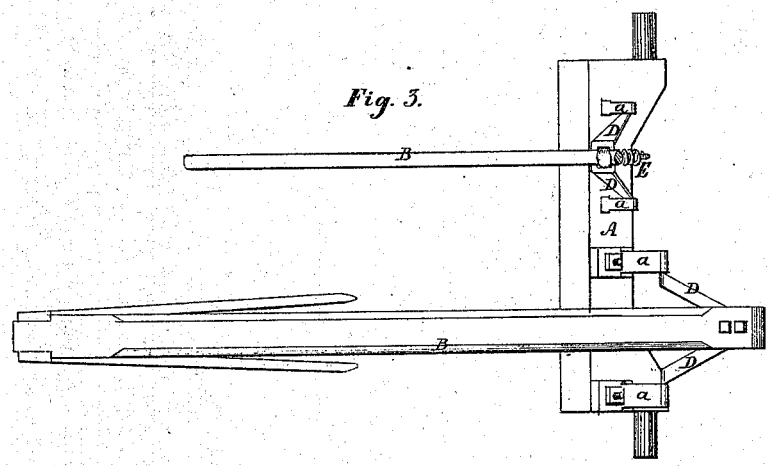
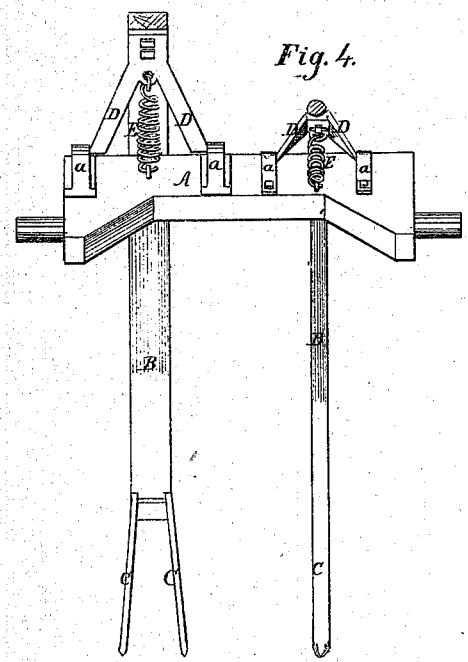

SOLOMON P. SMITH, OF WATERFORD, NEW YORK.

Letters Patent No. 112,507, dated March 7, 1871.

IMPROVEMENT IN HORSE HAY-RAKES.

The Schedule referred to in these Letters Patent and making part of the same.

I, SOLOMON P. SMITH, of Waterford, in the county of Saratoga and State of New York, have invented certain new and useful Improvements in Horse Hay-Rakes, of which the following is a specification.

In horse hay-rakes heretofore constructed the teeth of the drag-bars have been raised to release or dump the load, as also in passing hills and obstructions, against a direct force of the spring or springs, which constantly increases in proportion to the height to which the drag-bars may be elevated. By this arrangement the minimum degree of pressure upon the drag-bars and teeth is obtained at their lowest points of depression, and therefore their least degree of pressure must be at their points of bearing upon the ground. A great disadvantage results from this. As the hay accumulates upon the teeth it tends to press upward against the under side of the drag-bars and to lift the points of the teeth from the ground. The space thus made between the acting points of the teeth and the ground allows a considerable portion of the hay to be passed or remain ungathered, and also tends constantly to scatter and waste the hay already gathered within the rake-teeth. When any or all of the teeth are raised in passing over hills their pressure upon the ground is increased, and they dig into and scratch the ground and mix or stir the dirt into the hay so as to greatly injure its quality.

By reason of the force increasing as the teeth are raised, they are also more liable to break. In using steel-spring teeth this increasing force tends to bend them (as they are raised) out of line, and causes them to stick up and out from the others; and it furthermore increases the work of the horse and the labor of the driver in tilting the teeth.

It is the object of my invention to overcome these difficulties and disadvantages; and It consists in mounting the drag-bars to the rake-head or axle in such a manner and by means or devices which will cause the teeth to have their maximum degree of pressure at the point of contact with the ground, so that in elevating the teeth to dump the load, or as they rise to pass over hills or obstructions, the force of the pressure to be overcome will (after the teeth have been raised a certain distance) be diminished in proportion to the degree of their elevation above the ground. This is the chief feature of my invention, and which distinguishes it from all others of which I have any knowledge.

In the accompanying drawing I have represented two forms of drag-bars or teeth to which my invention is applied; and in which—

Figure 1 represents a cross-section of the axle or rake-head, showing one form of toothed drag-bar, and its connection with the axle in the position when at work under the maximum force of the spring, and by dotted lines when the force is exerted in a manner to balance the drag-bar and its teeth in an elevated position upon the axle.

Figure 2 represents a similar view, showing a modification both in the form of the toothed drag-bar and the devices which connect it with the rake-head.

Figures 3 and 4 represent a top and rear view of both these forms of toothed drag-bars attached to a portion of the axle.

My invention is applicable to any construction of horse hay-rake having a rolling axle, A, or a tilting rake-head, and, therefore, a description of the several parts which constitute a horse hay-rake is deemed unnecessary here further than to state that the rolling axle A is supported upon its carrying-wheels, so as to be capable of being partially turned or rocked, by suitable means under the immediate control of the driver, to elevate the teeth whenever it is necessary to free them from the accumulated load.

The position of the axle or rake-head and the connection of the drag-bars B therewith are such as to hold the latter in an inclined position when at work, and the teeth C, which they carry, may maintain an acute angle therewith or be curved as shown.

The teeth may be secured to the drag-bars in pairs, or formed in one piece with the drag-bars, and made either of steel spring-wire or light inflexible metallic rods, as may be deemed most useful.

The drag-bars are connected to the axle or rake-head by means of an arm or yoke, D, the arms of which are pivoted to brackets, a, secured to the axle or rake-head.

The spring E has one end connected to the yoke or drag-bar and the other to the axle or rake-head.

The angle or position of the yoke or arm and its relation to the spring and drag-bar must be such that when the teeth are down at work the force of the spring in pressing the teeth upon the ground will be at its maximum degree, and in raising the teeth either off the ground to dump the load or in passing obstructions, this force will, after the teeth have reached a given height, gradually diminish as the line of tension of the spring approaches a line coincident with one drawn through the pivots of the yoke or arm and the points of attachment of the spring to the drag-bar and axle or rake-head.

It must be observed that in producing this result the pivots of the yoke or arm must be between the points of attachment of the spring, and not in the line of tension thereof, when the teeth are at work raking, as shown in the drawing.

The axle or rake-head need not necessarily be the tilting-bar, as the means for tilting the rakes and limiting their descent in passing ruts may be independent of the carrying-bar.

The connection of the spring with the rake-head may be made adjustable, so as to increase or diminish the force of the spring, and also to adjust the line of the spring with respect to the pivots of the yoke.

This arrangement and connection of spring and yoke produce a sufficient uniform force to hold the rake-teeth to the ground against the upward pressure of the hay in loading, so that the teeth are prevented from rising, the raking done cleaner and without waste, and the hay gathered without filling it with dirt.

By this means of mounting and connecting the drag-bars with their springs, the latter are subjected to no increasing tensile-strain by the elevation of the drag-bars above a given height, and are less liable to be broken or lose their force.

By my invention teeth of cheaper material may be used, as the element of elasticity is not requisite, thus dispensing with spring-steel teeth.

I do not confine myself to the particular construction and arrangement of the devices represented for connecting the drag-bars to the axle or rake-head, but to vary these things to adapt them to different forms of horse hay-rakes, so long as the principal feature of diminishing instead of increasing the force of the spring by the rising of the drag-bars or teeth above a given height is maintained and carried out.

The drag-bars may be connected to their yokes in any convenient manner, and the proportions of the latter may be varied according to the manner of such attachment, the principle of operation being such as to hold the teeth down with increased pressure, but release them from such pressure as the tensile line of the spring approaches and is coincident with the pivots of the yoke, like a toggle or knee-joint.

Having described my invention,

I claim—

1. The teeth C, drag-bars B, and the teeth support A of a horse hay-rake, connected with their holding-spring, as described, so that the force thereof will be at its maximum degree when the teeth are down and working, and will diminish in proportion to the height at which they may rise or be elevated from the ground, essentially as described.

2. In a horse hay-rake, the combination of the drag-bars B, yokes or arms D, springs E, and axle or rake-head A, these parts being constructed and arranged to operate as described.

SOLOMON P. SMITH.

Witnesses:
J. W. HAMILTON JOHNSON,
A. E. H. JOHNSON.